(12) United States Patent
Lehtonen

(10) Patent No.: US 7,400,908 B2
(45) Date of Patent: Jul. 15, 2008

(54) MOBILE COMMUNICATION TERMINAL

(75) Inventor: Jarmo Lehtonen, Florence (IT)

(73) Assignee: Nokia Corporation, Espoo (FI)

( * ) Notice: Subject to any disclaimer, the term of this patent is extended or adjusted under 35 U.S.C. 154(b) by 399 days.

(21) Appl. No.: 11/100,832

(22) Filed: Apr. 7, 2005

(65) Prior Publication Data

US 2006/0229117 A1      Oct. 12, 2006

(51) Int. Cl.
*H04B 1/38* (2006.01)

(52) U.S. Cl. .................... 455/566; 455/575.3; 345/169; 345/173

(58) Field of Classification Search ........................ None
See application file for complete search history.

(56) References Cited

U.S. PATENT DOCUMENTS

| | | | |
|---|---|---|---|
| 6,256,017 B1 | 7/2001 | Bullister | 345/168 |
| 6,580,932 B1 | 6/2003 | Finke-Anlauff | 455/575 |
| 7,036,186 B2 * | 5/2006 | Jeong et al. | 16/303 |
| 2004/0212956 A1 | 10/2004 | Kuivas et al. | 361/683 |
| 2005/0020239 A1* | 1/2005 | Kang et al. | 455/573.3 |
| 2005/0026658 A1 | 2/2005 | Soejima | 455/575.1 |

FOREIGN PATENT DOCUMENTS

| | | |
|---|---|---|
| EP | 1 335 567 | 8/2003 |
| EP | 1 357 726 | 10/2003 |
| WO | WO 2004/054210 | 6/2004 |

* cited by examiner

*Primary Examiner*—Thanh Cong Le
(74) *Attorney, Agent, or Firm*—Ware, Fressola, Van Der Sluys & Adolphson

(57) ABSTRACT

A mobile communication terminal comprises three body elements connected by a multi-functional hinge member for movement from a closed folded operative position to a flipped open first operative position revealing a display carried by one body element and a first keypad carried by a second body element and to a folded keyboard flipped open position revealing an arrangement of keys carried by the third body element and the second body element on the side opposite the first keyboard. The first body element carrying the display is rotated in a plane parallel with the plane of the display to reveal the display for usage with the flipped open folded keyboard in a second operative position.

24 Claims, 6 Drawing Sheets

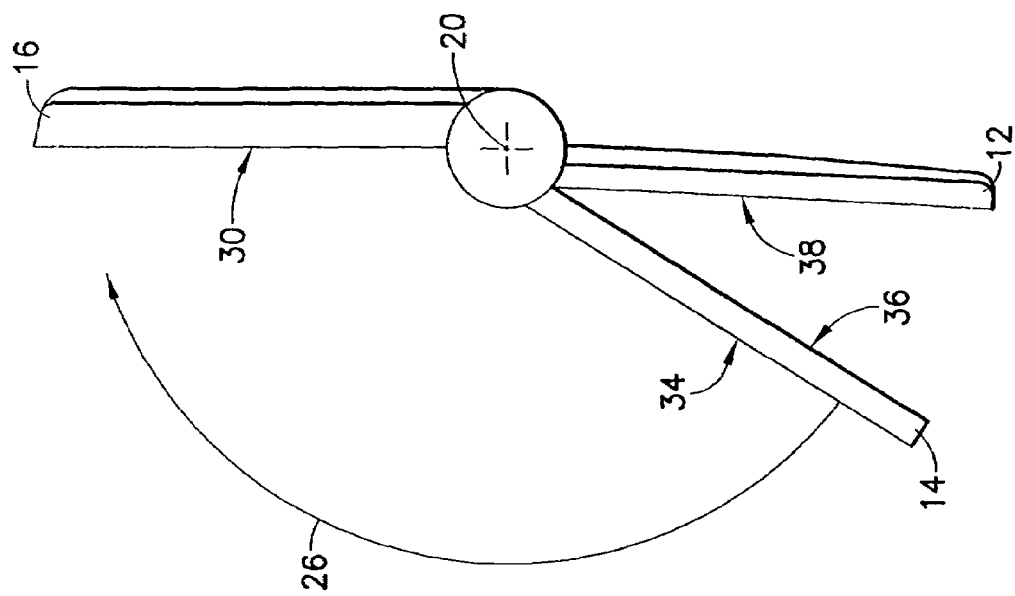
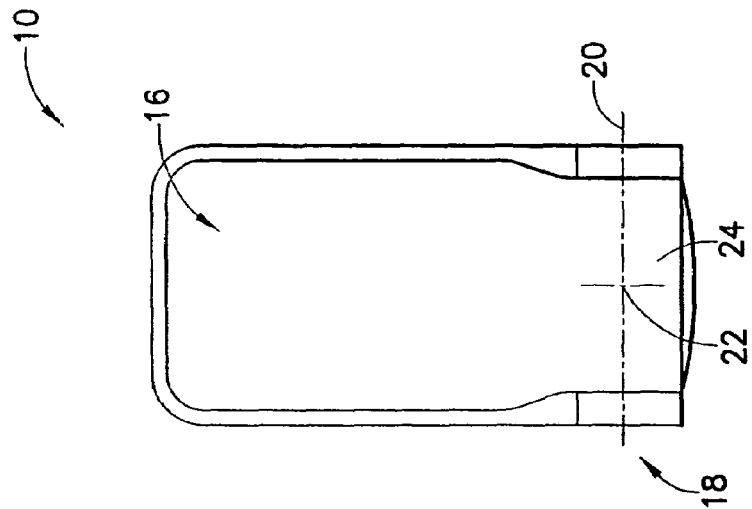
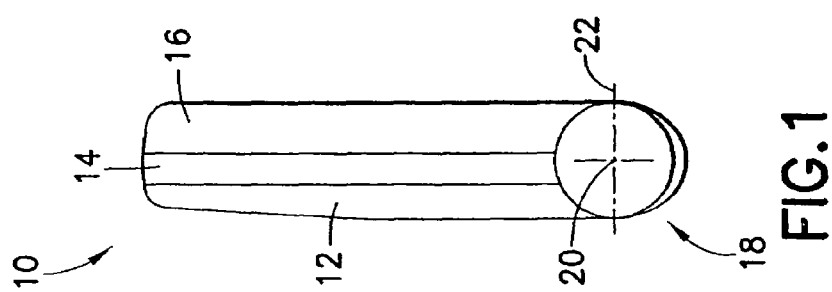

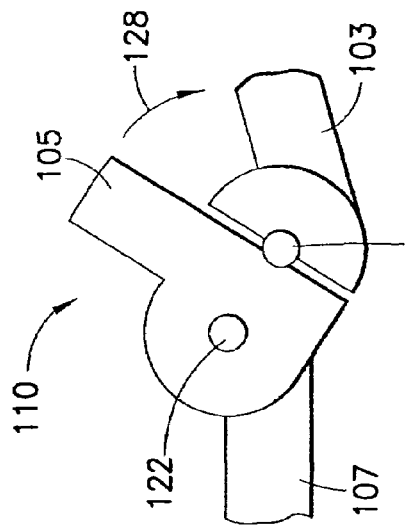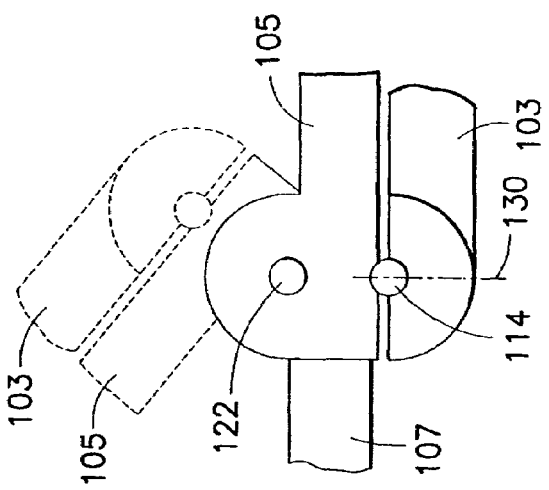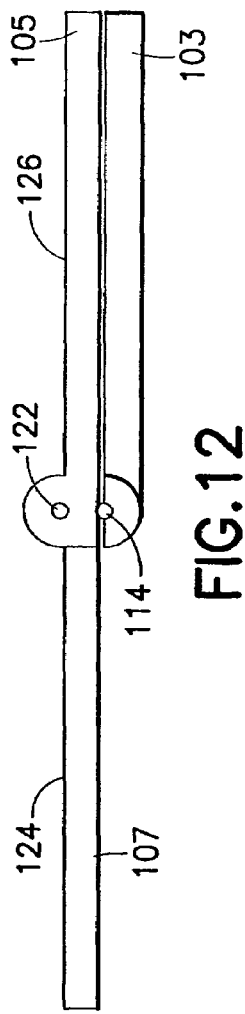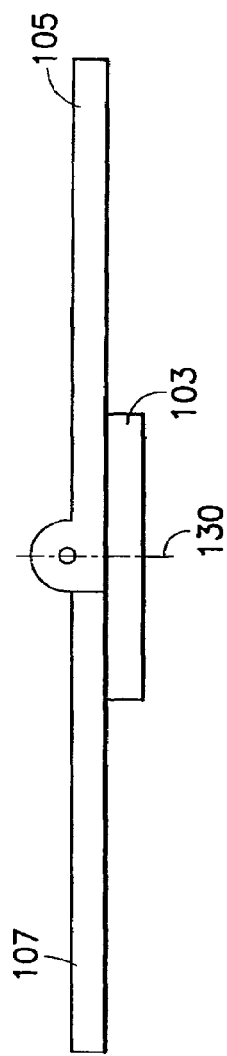

MOBILE COMMUNICATION TERMINAL

TECHNICAL FIELD

The present invention relates generally to electronic devices and deals more particularly with mobile communication terminals, specifically foldable mobile communication terminals and similar communication and gaming devices of the type having keyboard functionality.

BACKGROUND OF THE INVENTION

Portable electronic devices particularly mobile communication terminals and similar communication devices have rapidly expanded in use and function as users have demanded increasing functionality and smaller size. It is common to see mobile communication terminals that provide Global Computer Network access, messaging, personal information management, personal digital assistant functionality, music, facsimile and gaming, in addition to telephone communication. More complex keyboards have been provided to be compatible with the more complex applications that are found in such devices. Such keyboards have relatively small keys and are generally only satisfactory for operation using the "thumbs" of the user. One prior art attempt to provide a larger full function keyboard arrangement is disclosed in U.S. Pat. No. 6,580,932, assigned to the same assignee as the present invention in which a foldable keyboard is provided wherein a panel has an inner and outer surface and rotates between two positions. The panel carries a portion of the number of keys of the full function keyboard which keys are exposed on one side of the display for access and usage when the panel is rotated into an open position along with the remaining portion of the number of keys of the keyboard on the fixed panel on the opposite side of the display are exposed for access and usage when the rotated panel is in the open position. Although such devices are capable of providing more complex applications the display screen and communication keypad remain are not foldable and thus the size of the device cannot be reduced for both standard communication functionality and the advanced more complex keyboard functionalities.

It would be desirable therefore to provide a larger display screen size for both communication and keyboard functionality and a full function keyboard for such mobile communication terminal devices while maintaining the compact size of a foldable mobile communication terminal device.

SUMMARY OF THE INVENTION

In accordance with a first aspect of the invention, a mobile communication terminal is presented and provides a main body element having a first major surface relative to usage, a second body element having a second major surface relative to usage in a first operative position and a third major surface disposed opposite the second major surface and accessible relative to usage in a second operative position and a third body element having a fourth major surface relative to usage in the first operative position and the second operative position.

The main, second and third body elements are folded in a stacked relationship with respect to one another in a fully closed position with the second body element sandwiched between the main and third body elements and with the second body element second major surface in a face-to-face orientation with the third body element fourth major surface, and the second body element third major surface in a face-to-face orientation with the main body element first major surface. The third body element is arranged to flip open orienting the third body element major surface and the second body element second major surface in a substantially parallel plane and accessible for usage in the first operative position. The second body element is arranged to flip open orienting the second body element second major surface and the main body element first major surface in substantially parallel planes and accessible for usage, and the third body element is further arranged to rotate with the fourth major surface in a plane that is substantially parallel to the planes of the second body element second major surface and the main body element first major surface. The main body first major surface, second body element third major surface and third body element fourth major surface are accessible for usage in the second operative position. A display is carried by the third body element fourth major surface and the second body element second major surface includes an arrangement of keys to carry out an intended function and may be arranged as a communication keypad.

The second body element third major surface and the main body element first major surface include an arrangement of keys to carry out an intended function. The main body element first major surface and the second body element third major surface include an arrangement of keys defining a folded keyboard to carry out an intended function and the keyboard may be a QWETRY keyboard with approximately one-half of the keyboard carried on the main body element first major surface and the remaining one-half of the keyboard carried on the second body element third major surface.

The display may be a touch sensitive screen display and a stylus may be provided and suitably carried by the mobile communication terminal for use in contacting a desired spot on the touch sensitive screen display.

The third body element is arranged to flip about a first pivot axis that is positioned near an extremity of the main body element and the second body element is arranged to flip about a second pivot axis parallel with and offset from the first pivot axis that is positioned near the extremity of the main body element and the third body element.

In the second operative position, the third body element rotates about a third pivot axis that is positioned substantially at a central point defined between the main body element and the second body element in its flipped open position wherein the third body element is rotated substantially 90°. The mobile communication terminal is also configured to automatically change, if required, the orientation of information shown on the display when the mobile communication terminal is used in its first operation position and its second operative position.

In a further aspect of the invention, a mobile communication terminal comprises a main body element, a second body element, a third body element and a multi-functional hinge member arranged to connect the main, second and third body elements for movement with respect to one another wherein the main, second and third body elements are in a stacked overlying folded operative position in a closed operative position. The multi-functional hinge member is arranged to pivot the third body element to a flipped open position to reveal a display carried by the third body element and a first keyboard carried by the second body element in a first operative position.

The multi-functional hinge member is further arranged to pivot the second body element to a flipped open position to reveal a folded keyboard carried by the main body element and the second body element on a side disposed opposite the first keyboard. The multi-functional hinge member is further being arranged to rotate the third body element in a plane that is substantially parallel to the plane of the display to reveal the display and the folded keyboard for usage in a second operative position. The multi-functional hinge member is located at an extremity of the main, second and third body elements and has a first pivot axis about which the third body element rotates between the closed operative position and the flipped open first operative position, and has a second pivot axis parallel with and offset from the first pivot axis about which the second body element rotates between the flipped open first operative position to the folded keyboard flipped open position.

The multi-functional hinge member also has a third pivot axis substantially perpendicular to the first pivot axis about which the third body element rotates between the folded keyboard flipped open position to the second operative position.

The multi-functional hinge member is also arranged such that the third and second body elements rotate together about the second pivot axis between the closed operative position and the folded keyboard flipped open position.

The folded keyboard may be configured as a QWERTY keyboard and the display may be a touch sensitive screen display.

BRIEF DESCRIPTION OF THE DRAWINGS

FIG. 1 is a side view of a mobile communication terminal according to a first embodiment of the invention in a closed folded position.

FIG. 2 is a front view of the mobile communication terminal of FIG. 1 in the closed folded position.

FIG. 5 is a schematic side view of the mobile communication terminal showing the body element carrying the display flipped open and the sandwiched body element carrying the communication keypad and a portion of the foldable keyboard partially rotated between the closed folded position and the folded keyboard open position.

FIG. 12 is a schematic side view of the mobile communication terminal showing the body element carrying the display and the keypad/keyboard body element in the folded keyboard flipped open position.

FIG. 13 is an enlarged schematic partial side view of the multi-functional hinge member showing the compound motion of the body element carrying the display and the keypad/keyboard body element as they move between the fully flipped open first operative position and the folded keyboard flipped open position.

FIG. 14 is an enlarged schematic partial side view of the multi-functional hinge member showing the motion of the body element carrying the display and the keypad/keyboard body element as they move with one another from the fully closed folded operative position to the folded keyboard flipped open position.

FIG. 15 is a schematic side view of the mobile communication terminal showing the body element carrying the display rotated 90° about the multi-functional hinge member pivot axis to the second operative position.

WRITTEN DESCRIPTION OF PREFERRED EMBODIMENTS

Figure 4:
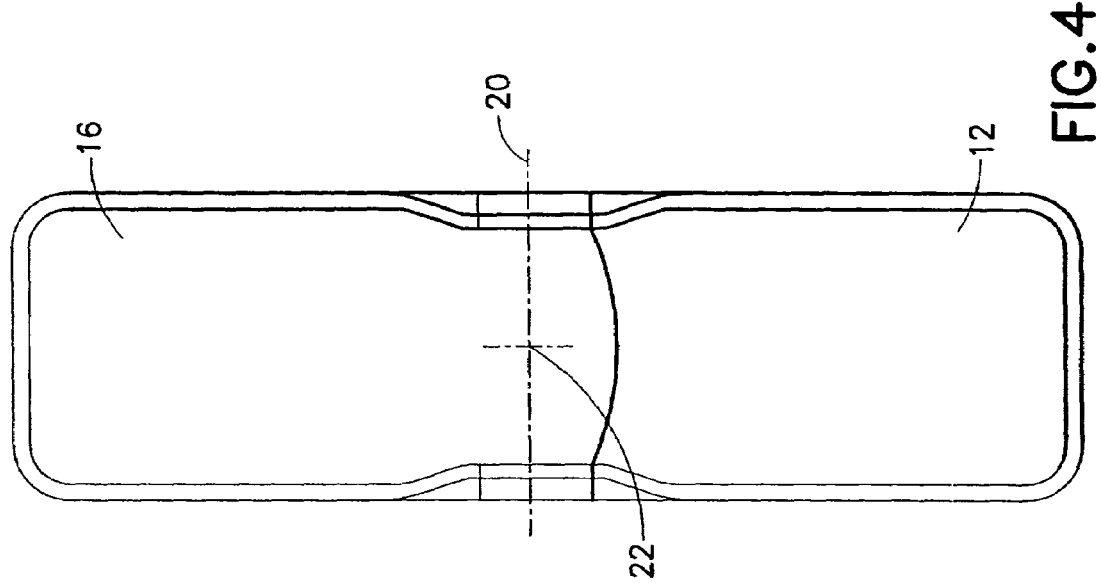
FIG. 4 is a rear plan view of the mobile communication terminal illustrated in FIG. 3.

The mobile communication terminal, for example a mobile phone, according to the preferred embodiments described herein for purposes of explanation of the invention are adapted for communication via a cellular network, such as the GSM 900/1800 MHz network, but could just as well be adapted for use with a Code Division Multiple Access (CDMA) network, a G3 network, or a TCP/IP-based network to cover a possible VoIP-network (e.g. via WLAN, WIMAX or similar).

The mobile communication terminals according to the preferred embodiments described herein comprise all conventional components (internal components not shown) of a mobile communication terminal such as a microprocessor for controlling the operation of the mobile phone and a program memory for storing programs used by the mobile phone. Input/output circuits interface the microprocessor with the keys, the display, audio processing circuits, receiver, and transmitter. The audio processing circuits provide basic analog audio outputs to the speaker and accept analog audio inputs from the microphone. A conventional signal combiner permits two-way, fully duplex communication over a common internal antenna. The processor forms the interface to the peripheral units of the apparatus, including a RAM memory and a Flash ROM memory, a SIM card and the keys, multi-way pads and joysticks, as well as data, power supply (rechargeable battery), etc. As these components are well known, they are neither further described in detail nor illustrated in the drawings. It will also be recognized that the invention may be equally applied to portable electronic devices other than mobile communication terminals.

Figure 3:
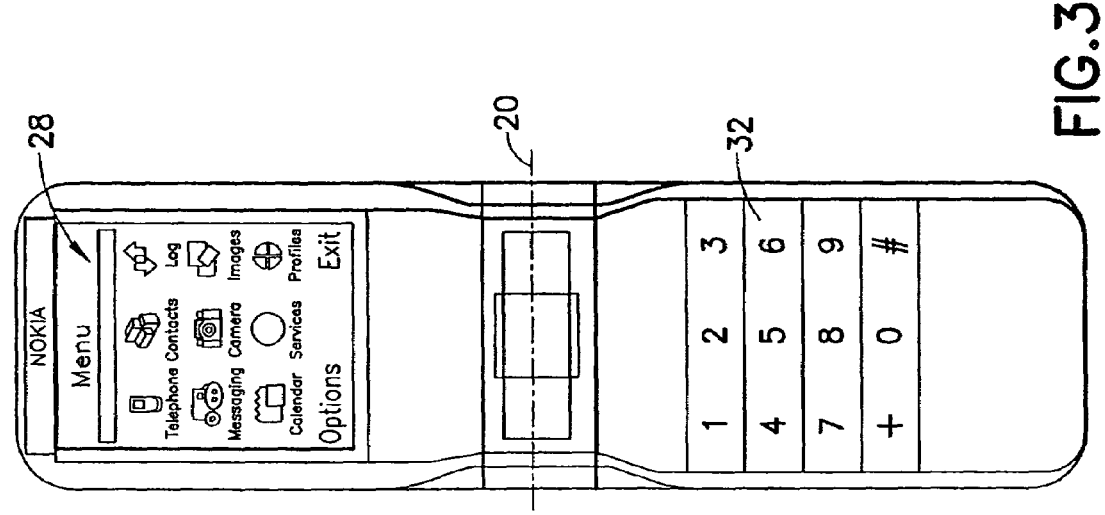
FIG. 3 is a front plan view of the mobile communication terminal showing the body element carrying the display flipped open in a first operative position revealing the display and communication keypad.

Now turning to the drawings and considering the invention in further detail, a mobile communication terminal generally designated 10 is illustrated in FIGS. 1 and 2 in a fully closed folded position and comprises a main body element 12, a second body element 14 sandwiched between the main body element 12 and a third body element 16 wherein the body elements 12, 14 and 16 are in a stacked overlying folded clamshell-like operative position. A multi-functional hinge member generally designated 18 is arranged to connect the main body element 12, the second body element 14 and the third body element 16 for movement with respect to one another about a first pivot axis 20 of the multi-functional hinge member 18. The third body element 16 is arranged to rotate about a second pivot axis 22 generally perpendicular to the axis 20 and located in the central portion 24 of the multi-functional hinge member 18. The multi-functional hinge member 18 is arranged to pivot the third body element 16 along an arcuate path 26 from the fully closed folded position to a flipped open first operative position to reveal a display 28 carried on a first major surface 30 relative to usage on the third body element 16 and to reveal a first keyboard generally designated 32 carried on a second major surface generally designated 34 relative to usage in a first open operative position as shown in FIGS. 3 and 4. The first keyboard 32 comprises a number of keys arranged to carryout an intended function which in the illustrated embodiment the keys are arranged as a communication keypad located below the display 28.

Figure 6:
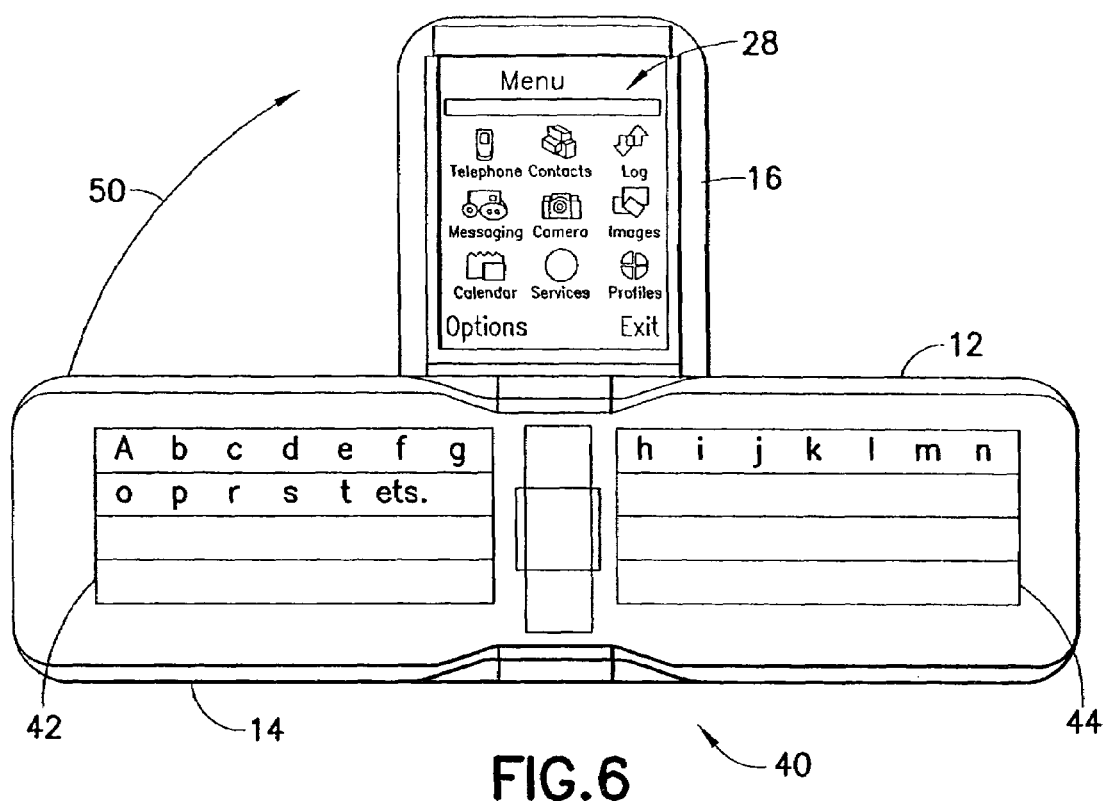
FIG. 6 is a front plan view of the mobile communication terminal showing the folded keyboard flipped open to its operative position and the display body element rotated 90° to reveal the display.

The multi-functional hinge member 18 is further arranged to pivot the second body element 14 about the pivot axis 20 along an arcuate path 26 to a flipped open second operative position to reveal a folded keyboard generally designated 40 as illustrated in FIG. 6. The folded keyboard 40 is comprised of a number of keys arranged to carryout an intended function and one portion of the keys 42 is carried on a third major surface 36 relative to usage disposed opposite the second major surface 34 on the second body element 14. The remaining portion of keys generally designated 44 forming the folded keyboard 40 are carried on a first major surface 38 relative to usage on the main body element 12. The keys 42, 44 may be arranged in a any suitable arrangement to carry out an intended function such as for example the keys may be arranged to form a QWERTY keyboard.

Figure 7:
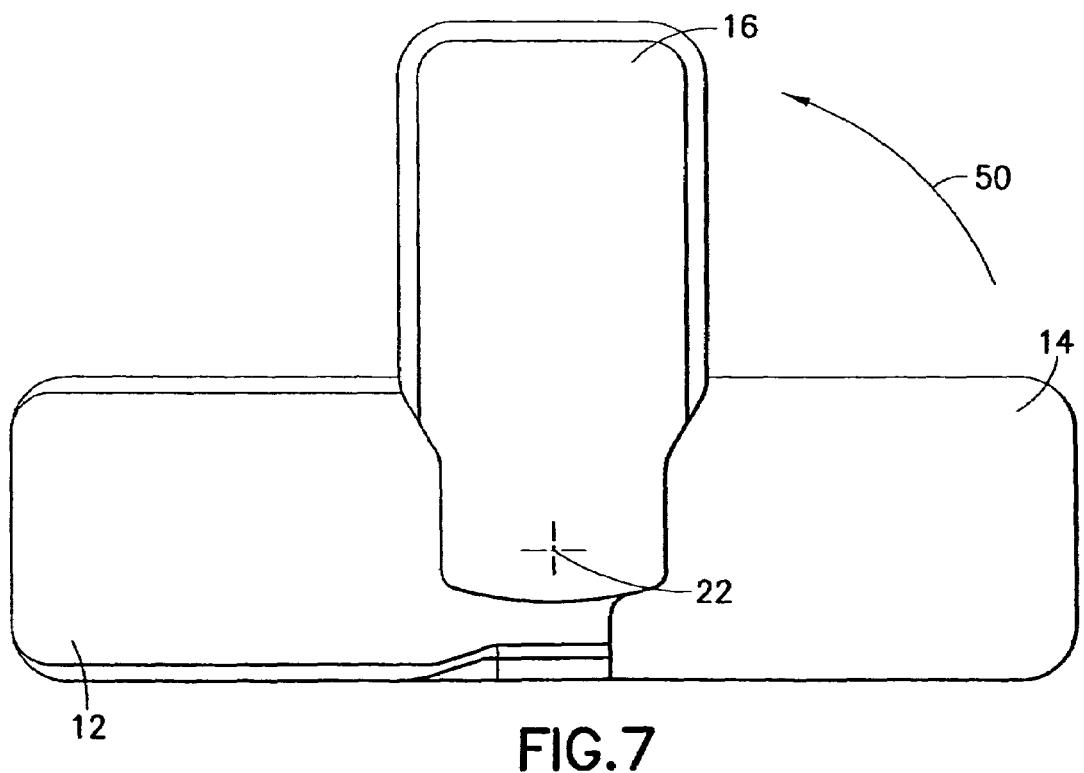
FIG. 7 is a rear plan view of the mobile communication terminal illustrated in FIG. 6.
Figure 9:
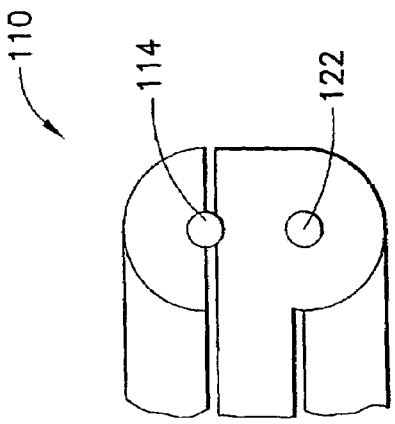
FIG. 9 is an enlarged schematic partial side view of the multi-functional hinge member showing the hinge member of the fully folded closed mobile communication terminal illustrated in FIG. 8.
Figure 11:
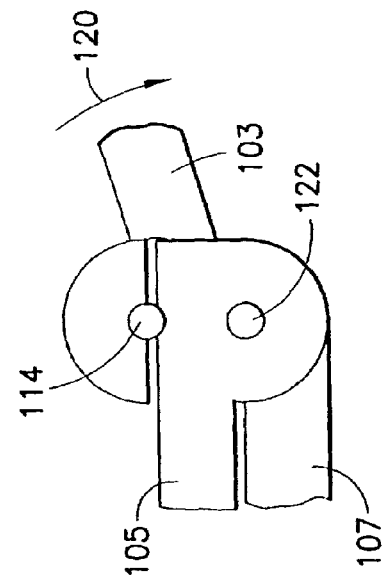
FIG. 11 is an enlarged schematic partial side view of the hinge multi-functional hinge member showing the body element carrying the display in an intermediate position as it moves between the fully closed folded position and the flipped open first operative position.

The multi-functional hinge member 18 is further arranged to rotate the third body element 16 in a plane that is substantially parallel to the plane of the display 28 from its hidden position behind the second body element 14 about the multi-functional hinge member pivot 22 to place the mobile communication terminal in a second operative position wherein the keys 42, 44 of the folded keyboard 40 are located below the display 28. As illustrated in FIGS. 6 and 7, the third body element 16 carrying the display 28 follows an arcuate path 50 through a 90 degree angle as it rotates to the second open operative position. The mobile communication terminal is configured to automatically change, if required, the orientation of information shown on the display 28 when the mobile communication terminal is used in its first open operative position as illustrated in FIG. 3 and in its second open operative position as illustrated in FIG. 6.

Figure 8:
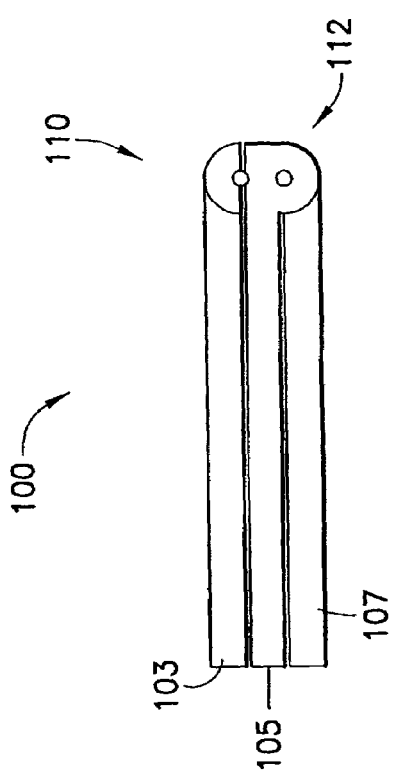
FIG. 8 is a schematic side view of the mobile communication terminal showing the display body element, keypad/keyboard body element and main body element in the fully folded closed operative position.
Figure 10:
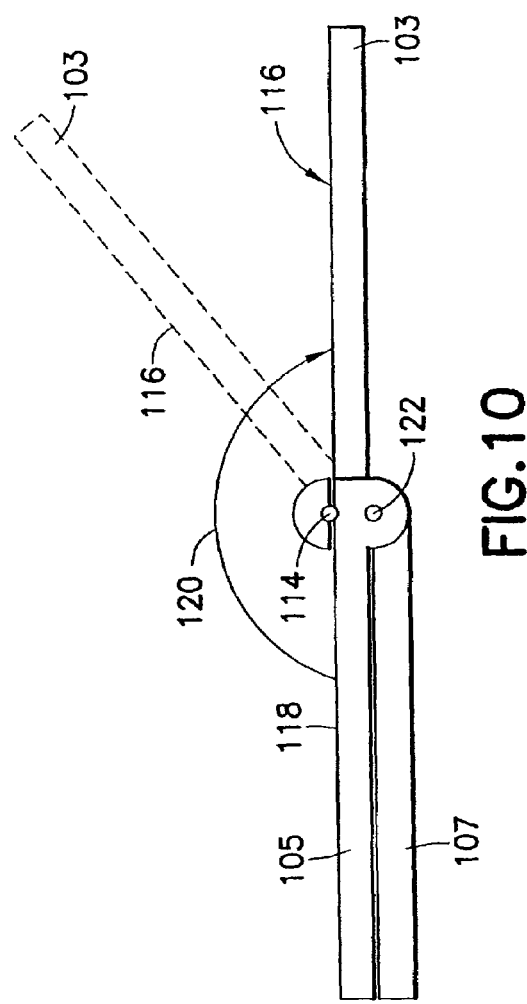
FIG. 10 is a schematic side view of the mobile communication terminal showing the body element carrying the display flipped open to the first operative position.

Turning now to FIGS. 8-15, a mobile communication terminal is illustrated schematically in a side view and is generally designated 100 wherein the display body element 103, a keypad/keyboard body element 105 and main body element 107 are illustrated in the fully folded closed operative position. A multi-functional hinge member generally designated 110 is arranged to connect the display body element 103, keypad/keyboard body element 105 and main body element 107 for movement with respect to one another and is located at one end 112 near the extremities of the body elements 103, 105 and 107. A multi-functional hinge member 110 includes a first pivot axis 114 arranged to pivot the display body element 103 between the fully closed operative position as illustrated in FIG. 8 to the fully flipped open position as illustrated in FIG. 10 to reveal a display carried on a major surface 116 relative to usage. An arrangement of keys defines a first keyboard and is carried on a major surface 118 of the keypad/keyboard body element 105. As shown in phantom in FIG. 10, the display body element 103 rotates about the pivot axis 114 along an arcuate path 120 to the first operative position wherein the keypad and display are accessible and available for usage. The multi-functional hinge member 110 also includes a second pivot axis 122 substantially parallel with the first pivot axis 114 and offset therefrom to permit the rotation of the keypad/keyboard body element 105 to the folded keyboard flipped open position as illustrated schematically in FIG. 12 wherein the portion of the keys comprising the folded keyboard are carried on a major surface 124 relative to usage of the main body element 107 and the remaining portion of the keys forming the folded keyboard are carried on the major surface 126 relative to usage of the keypad/keyboard body element 105. As illustrated in FIG. 13, the multi-functional hinge member 110 rotates with a compound motion in the direction of arrow 128 as the keypad/keyboard body element 105 is rotated to position the display body element 103 beneath the folded keyboard flipped open position as illustrated in FIG. 12. The display body element 103 is rotated about a third pivot axis 130 substantially perpendicular to the axis 114 and 122 in the folded keyboard fully flipped open position to place the mobile communication terminal in its second operative position. As illustrated in FIG. 15, the display body element 103 and keypad/keyboard body element 105 may move together between the fully closed operative position as illustrated in FIG. 8 to the folded keyboard fully flipped open position as illustrated in FIG. 12. The multi-functional hinge member 110 may be molded as part of the body elements 103, 105 and 107 during the manufacture of those parts or may be a separately manufactured part suitably attached to the body elements during assembly.

Figure 16:
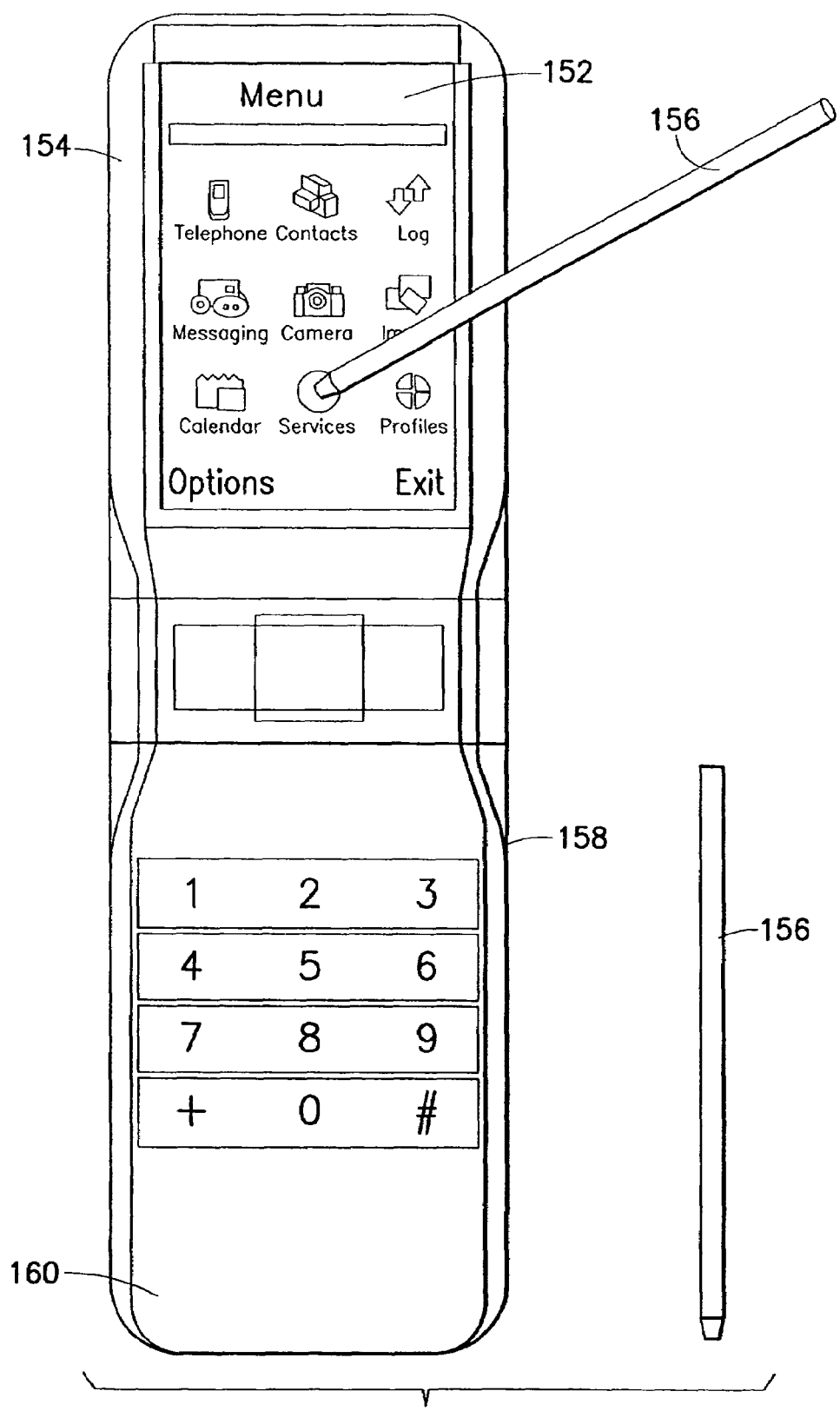
FIG. 16 is a front plan view of a mobile communication terminal according to a second embodiment of the invention showing the body element carrying a touch sensitive screen display flipped open in a first operative position.

FIG. 16 is a front plan view of a mobile communication terminal according to a further embodiment of the invention and is similar to the mobile communication terminal illustrated in FIG. 3 and is generally designated 150. The display 152 carried by the display body element 154 is a touch sensitive screen display of a suitable type wherein a user contacts an appropriate icon or identified text to initiate and carryout the function corresponding to the icon or text. As illustrated in FIG. 16, a stylus 156 may be used to contact the desired icon or text to initiate the operation or functionality associated with the given icon or text. The stylus 156 may be suitably carried by a holder of an appropriate type attached to the side 158 of the keypad/keyboard body element 160 or may be received in a storage receptacle formed within the main body element housing or other appropriate location on the keypad/keyboard body element 158 or the display body element 154. The operation of the multi-functional hinge member is substantially identical to that described above.

Although the present invention has been described in detail for purposes of illustration, it is understood that such detail is solely for that purpose, and variations can be made therein by those skilled in the art without departing from the scope of the invention.

The invention claimed is:

1. A mobile communication terminal, comprising:
   a main body element having a first major surface relative to usage;
   a second body element having a second major surface relative to usage in a first open operative position and a third major surface disposed opposite said second major surface and accessible relative to usage in a second open operative position,
   a third body element having a fourth major surface relative to usage in said first open operative position and said second open operative position,
   said main, second and third body elements are folded in a stacked relationship with respect to one another in a fully closed folded position with said second body element sandwiched between said main and third body elements and with said second body element second major surface in a face-to-face orientation with said third body element fourth major surface and said second body element third major surface in a face-to-face orientation with said main body element first major surface;

said third body element arranged to flip open orienting said third body element major surface and said second body element second major surface in a substantially parallel plane and accessible for usage in said first open operative position;

said second body element arranged to flip open orienting said second body element second major surface and said main body element first major surface in substantially parallel planes and accessible for usage, and said third body element further arranged to rotate with said fourth major surface in a plane that is substantially parallel to the planes of said second body element second major surface and said main body element first major surface, said main body first major surface, said second body element third major surface and said third body element fourth major surface accessible for usage in said second open operative position.

2. The mobile communication terminal as defined in claim 1, further comprising a display carried by said third body element fourth major surface.

3. The mobile communication terminal as defined in claim 1 wherein said second body element second major surface includes an arrangement of keys to carry out an intended function.

4. The mobile communication terminal as defined in claim 3 wherein said arrangement of keys is a communication keypad.

5. The mobile communication terminal as defined in claim 1 wherein said second body element third major surface includes an arrangement of keys to carry out an intended function.

6. The mobile communication terminal as defined in claim 1 wherein said main body element first major surface includes an arrangement of keys to carry out an intended function.

7. The mobile communication terminal as defined in claim 1 wherein said main body element first major surface and said second body element third major surface include an arrangement of keys defining a keyboard to carry out an intended function.

8. The mobile communication terminal as defined in claim 7 wherein said keyboard further comprises a QWETRY keyboard with approximately one-half of said keyboard carried on said main body element first major surface and the remaining one-half said keyboard carried on said second body element third major surface.

9. The mobile communication terminal as defined in claim 2 wherein said display further comprises a touch sensitive screen display.

10. The mobile communication terminal as defined in claim 9 further comprising a stylus suitably carried by the mobile communication terminal for use in contacting a desired spot on said touch sensitive screen display.

11. The mobile communication terminal as defined in claim 1 wherein said third body element flips about a first pivot axis that is positioned near an extremity of said main body element and said second body element.

12. The mobile communication terminal as defined in claim 11 wherein said second body element flips about a second pivot axis parallel with and offset from said first pivot axis that is positioned near said extremity of said main body element and said third body element.

13. The mobile communication terminal as defined in claim 1 wherein in said second open operative position said third body element rotates about a third pivot axis that is positioned substantially at a central point defined between said main body element and said second body element in its flipped open position.

14. The mobile communication terminal as defined in claim 13 wherein said third body element is rotated substantially 90°.

15. The mobile communication terminal as defined in claim 14, wherein the mobile communication terminal is configured to automatically change, if required, the orientation of information shown on the display when the mobile communication terminal is used in its first open operation position and its second open operative position.

16. A mobile communication terminal comprising:
a main body element;
a second body element;
a third body element;
a multi-functional hinge member arranged to connect said main, second and third body elements for movement with respect to one another wherein:
said main, second and third body elements are in a stacked overlying folded operative position in a closed operative position;
said multi-functional hinge member is arranged to pivot said third body element to a flipped open position to reveal a display carried by said third body element and a first keyboard carried by said second body element in a first operative position;
said multi-functional hinge member is arranged to pivot said second body element to a flipped open position to reveal a folded keyboard carried by said main body element and said second body element on a side disposed opposite said first keyboard, said multi-functional hinge member further being arranged to rotate said third body element in a plane that is substantially parallel to the plane of the display to reveal the display and said folded keyboard for usage in a second operative position.

17. The mobile communication terminal defined in claim 16 further comprising said multi-functional hinge member located at an extremity of said main, second and third body elements.

18. The mobile communication terminal defined in claim 17 further comprising said multi-functional hinge member having a first pivot axis about which said third body element rotates between said closed operative position and said flipped open first operative position.

19. The mobile communication terminal as defined in claim 18 further comprising said multi-functional hinge member having a second pivot axis parallel with and offset from said first pivot axis about which said second body element rotates between said flipped open first operative position to said folded keyboard flipped open position.

20. The mobile communication terminal as defined in claim 19 further comprising said multi-functional hinge member having a third pivot axis substantially perpendicular to said first pivot axis about which said third body element rotates between said folded keyboard flipped open position to said second operative position.

21. The mobile communication terminal as defined in claim 19 further comprising said multi-functional hinge member being arranged such that said third and second body elements rotate together about said second pivot axis between said closed operative position and said folded keyboard flipped open position.

22. The mobile communication terminal as defined in claim 16 further comprising said folded keyboard being a QWERTY keyboard.

23. The mobile communication terminal as defined in claim 16 further comprising said display being a touch sensitive screen display.

24. Computer program stored in a computer readable medium and executable by a processor in a mobile communication terminal for automatically changing, if required, the orientation of information shown on a display of the mobile communication terminal when the mobile communication terminal is used in its first open operative position and in its second open operative position wherein the mobile communication terminal has:
- a main body element having a first major surface relative to usage;
- a second body element having a second major surface relative to usage in a first open operative position and a third major surface disposed opposite said second major surface and accessible relative to usage in a second open operative position,
- a third body element having a fourth major surface for carrying a display relative to usage in said first open operative position and said second open operative position,
- said main, second and third body elements are folded in a stacked relationship with respect to one another in a fully closed folded position with said second body element sandwiched between said main and third body elements and with said second body element second major surface in a face-to-face orientation with said third body element fourth major surface and said second body element third major surface in a face-to-face orientation with said main body element first major surface;
- said third body element arranged to flip open orienting said third body element major surface and said second body element second major surface in a substantially parallel plane and accessible for usage in said first open operative position;
- said second body element arranged to flip open orienting said second body element second major surface and said main body element first major surface in substantially parallel planes and accessible for usage, and said third body element further arranged to rotate with said fourth major surface in a plane that is substantially parallel to the planes of said second body element second major surface and said main body element first major surface, said main body first major surface, said second body element third major surface and said third body element fourth major surface accessible for usage in said second open operative position, wherein in said second open operative position said third body element rotates substantially 90° about a third pivot axis that is positioned substantially at a central point defined between said main body element and said second body element in its flipped open position.

* * * * *

UNITED STATES PATENT AND TRADEMARK OFFICE
CERTIFICATE OF CORRECTION

PATENT NO. : 7,400,908 B2  Page 1 of 1
APPLICATION NO. : 11/100832
DATED : July 15, 2008
INVENTOR(S) : Jarmo Lehtonen It is certified that error appears in the above-identified patent and that said Letters Patent is hereby corrected as shown below:

In column 2 at line 48, please delete "operation" and insert --operative-- therefor.

In column 8 at line 16 (claim 15, line 5), please delete "operation" and insert --operative-- therefor.

Signed and Sealed this

Twenty-first Day of October, 2008

JON W. DUDAS
*Director of the United States Patent and Trademark Office*